(12) United States Patent
Tsuruya et al.

(10) Patent No.: US 7,556,139 B2
(45) Date of Patent: Jul. 7, 2009

(54) HANGER SYSTEM

(75) Inventors: Kazutaka Tsuruya, Tokyo (JP); Tatsuo Suzuyoshi, Tokyo (JP); Kenichi Mitsugi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 12/009,511

(22) Filed: Jan. 18, 2008

(65) Prior Publication Data
US 2008/0179167 A1    Jul. 31, 2008

(30) Foreign Application Priority Data
Jan. 26, 2007    (JP)    ............................ 2007-017044

(51) Int. Cl.
*B65G 29/00*    (2006.01)
(52) U.S. Cl. ................. 198/465.4; 198/684; 198/343.2; 104/168
(58) Field of Classification Search ............. 198/343.2, 198/465.3, 465.4, 684, 685, 678.1; 104/165, 104/168, 173.1
See application file for complete search history.

(56) References Cited

U.S. PATENT DOCUMENTS

| 4,212,384 | A | * | 7/1980 | Grube | 198/684 |
| 4,564,100 | A | * | 1/1986 | Moon | 198/465.3 |
| 5,067,413 | A | * | 11/1991 | Kiuchi et al. | 104/168 |
| 6,360,671 | B1 | * | 3/2002 | Nakagami | 104/168 |
| 6,494,142 | B2 | * | 12/2002 | Masugaki et al. | 104/168 |

FOREIGN PATENT DOCUMENTS

JP    2005-162445    6/2005

* cited by examiner

*Primary Examiner*—James R Bidwell
(74) *Attorney, Agent, or Firm*—Carrier, Blackman & Associates, P.C.; Joseph P. Carrier; William D. Blackman

(57) ABSTRACT

A hanger system provided with a hanger drive device for driving a hanger for conveying a conveyance object. The hanger drive device includes a drive wheel facing a bar provided to the hanger, a pinch roll, and a cylinder for pushing the pinch roll toward the drive wheel. The hanger moves when the bar is pushed towards the drive wheel by the pinch roll. When the pinch roll returns to a stand-by position, the bar is separated from the drive wheel, and the movement stops.

3 Claims, 9 Drawing Sheets

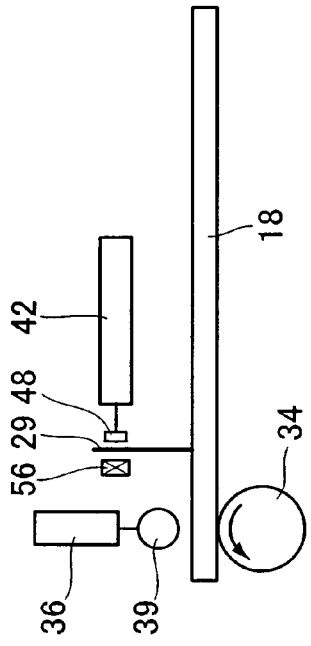
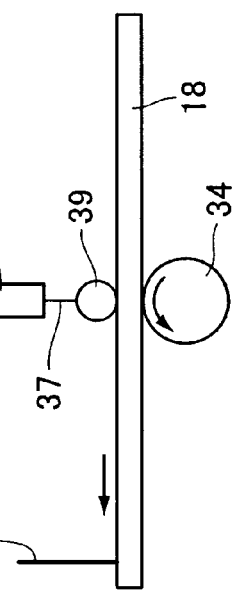
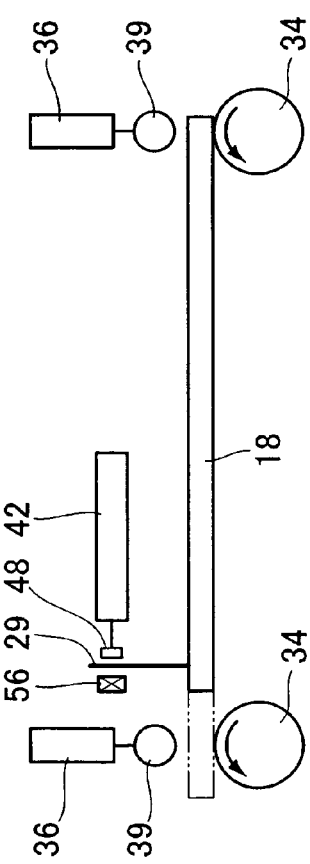
FIG.7A
FIG.7B
FIG.7C

HANGER SYSTEM

FIELD OF THE INVENTION

The present invention relates to an improvement in a hanger system with a hanger for conveying a conveyance object.

BACKGROUND OF THE INVENTION

Vehicle bodies and components are conveyed by a conveyor device in an automotive vehicle production line. Ordinarily, an overhead conveyor from which an upper part of a hanger suspends is preferably used in the conveyor device, as taught in Japanese Patent Application Laying-Open Publication No. 2005-162445 (JP 2005-162445 A). The conveyor device will be described below with reference to FIGS. 9A and 9B hereof.

As shown in FIGS. 9A and 9B, a plurality of hangers 102 is suspended on a support rail 101. Drive chains 104A, 104B, which have a plurality of engaging protrusions 103, are provided along the support rail 101.

For example, a front door 106 and a rear door 107 are suspended from a hanger 102. When the drive chains 104A, 104B are caused to rotate in the counterclockwise direction as shown by the arrows, the engaging protrusions 103 will engage with the hanger 102, and the hanger 102 will be conveyed. The plurality of hangers 102 will be conveyed in unison.

Transfer means 108 is provided between the drive chain 104A and the drive chain 104B. The hanger 102 is transferred from the drive chain 104A to the drive chain 104B, as shown in FIG. 9B.

Each transfer means 108 normally has its own drive source (e.g., a cylinder unit), and the speed thereof is controlled to allow conveying to be performed at high or low speed, or halted.

However, the transfer means 108 is generally used to move the hangers 102 over a relatively short distance LL, as shown in the drawings.

The distance LL is designed to merely move the hangers, and is thus used inefficiently. Using this distance for an installation stage or the like is therefore preferred. However, the length provided by the distance LL is insufficient, and a greater length is required.

When a plurality of transfer means 108 of length LL is connected in series to increase their length, a plurality of drive sources will have to be synchronized so that adjacent hangers 102 do not collide, and the synchronization control becomes more complicated. In addition, operating costs increase because of the need to operate a plurality of drive sources.

SUMMARY OF THE INVENTION

An object of the present invention to provide a hanger system that has a drive arrangement instead of the transfer means that has a cylinder unit or the like as a drive source, and that also enables operating costs to be reduced.

According to an aspect of the present invention there is provided a hanger system for conveying a conveyance object by using a hanger, the system comprising: a plurality of hangers each having a bar whose length does not exceed a pitch of adjacent hangers; and a plurality of hanger drive devices provided correspondingly to the hangers to drive the respective hangers, wherein each of the hanger drive devices includes a drive wheel and a pinch roll which are disposed on either side of the bar and provided on a building, and a cylinder provided on the building for moving the pinch roll back and forth with respect to the drive wheel, so that the respective hanger moves when the respective bar is pushed against the drive wheel by the pinch roll and stops moving when the pinch roll returns to a stand-by position to cause the bar to separates from the drive wheel.

In the present invention, the hanger drive device thus comprises a drive wheel, which faces a bar provided to the hanger; a pinch roll; and a cylinder for pushing the pinch roll toward the drive wheel. The hanger moves when the bar is pushed against the drive wheel by the pinch roll. When the pinch roll has returned to a stand-by position, the bar separates from the drive wheel, and the movement of the bar is halted. Therefore, a plurality of drive sources is unnecessary. The hanger is only moved by the drive wheel when the pinch roll is advanced by the cylinder. When the pinch roll is withdrawn backwards, little energy is lost by the free rotation of the drive wheel.

Preferably, the drive wheels are all driven by a single drive source. In a case where a motor is attached to each of the drive wheels, a risk is presented that adjacent hangers will collide when a difference exists in the speed of the motors. As a result, servo motors are used as the motors, and precision speed control becomes necessary, which increases the equipment cost. In this respect, if the plurality of drive wheels is driven by a single drive source, no concerns will be presented in regard to collisions between adjacent hangers. An inexpensive general-purpose motor can be used for the drive source, and equipment costs can be reduced.

In order to compensate for the difference between the pitch and the length of the bars, the system further comprises a plurality of pushing mechanisms for pushing the hangers at least the difference between the pitch and the length of the bar. The fact that the pushing mechanisms have been provided thus enables the bars to be readily brought toward the adjacent drive wheels, which allows the bar to be moved smoothly. The bars can be secured in place merely by providing a positioning mechanism to the pushing mechanism, and a variety of operations can be carried out with the bars in the secured state.

BRIEF DESCRIPTION OF THE DRAWINGS

A preferred embodiment of the present invention will be described in detail below, by way of example only, with reference to the accompanying drawings, in which:

FIGS. 7A to 7C are schematic views showing states in which a bar moves on the hangar;

DESCRIPTION OF THE PREFERRED EMBODIMENT

Figure 1:
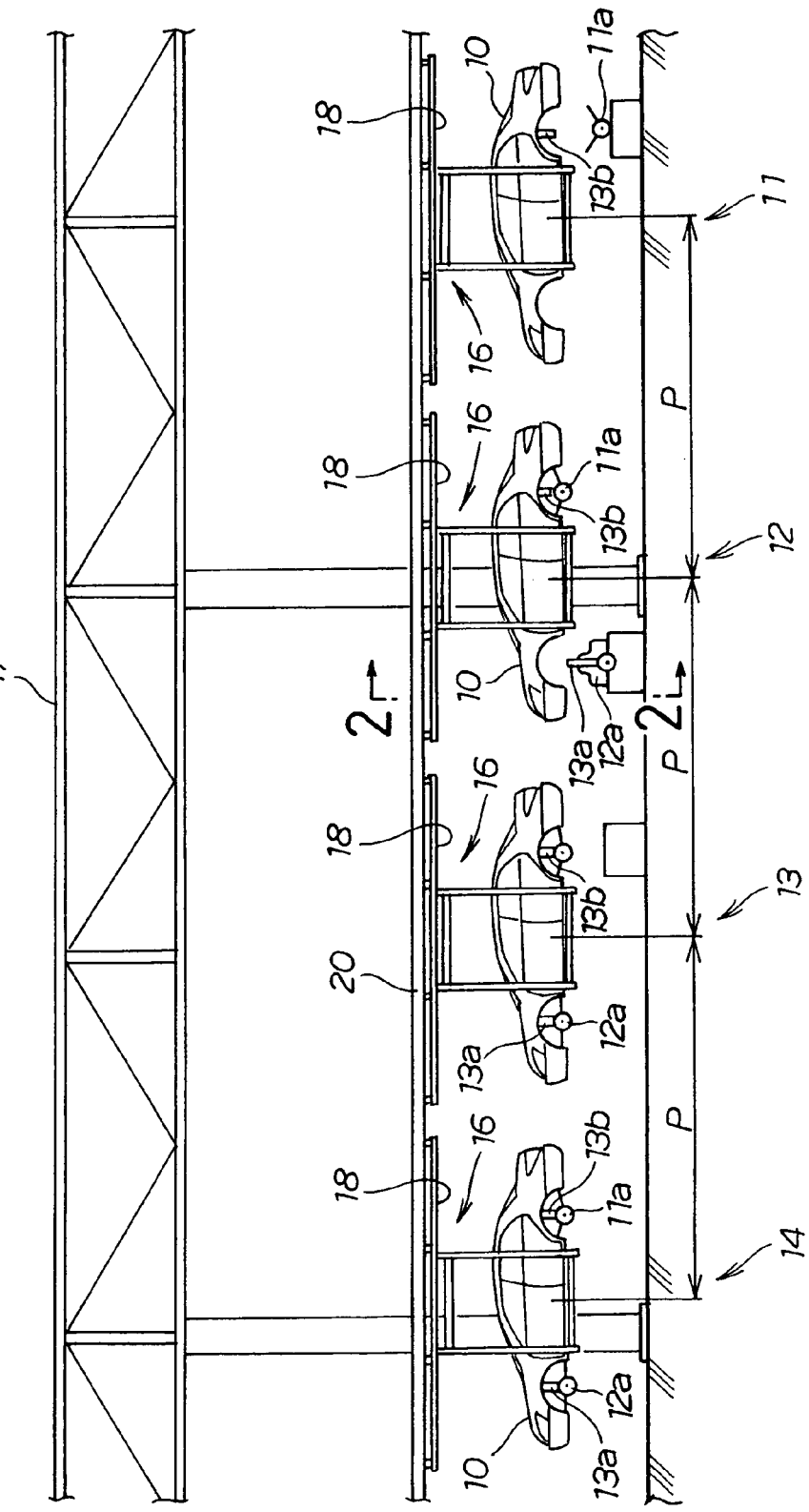
FIG. 1 is a schematic view showing a vehicle production line.

According to FIG. 1, for example, the following stages are in a serial arrangement; namely, a rear suspension installation stage 11 for installing wheel hubs and rear suspension 11a on a rear part of a vehicle body 10; an engine installation stage 12 for installing an engine and front suspension 12a, which has a front cushion 13a, on the vehicle body 10; a cushion installation stage 13 for connecting a rear cushion 13b having an upper end attached to the vehicle body 10 in advance, to a knuckle (not shown) on the rear suspension 11a; and an inspection stage 14 for inspecting the state of installation following the cushion installation stage.

Vehicle bodies 10 that are supported on each of a plurality of hangers 16 are sequentially conveyed to the stages 11 to 14. In order for the conveying to be performed, a support rail 20 extends horizontally inside a building 17, and the plurality of hangers 16 are supported on the support rail 20 so as to be capable of moving horizontally. The hangers 16, which will be described in detail below, have bars 18 that are slightly shorter than a pitch P between adjacent hangers 16.

The pitch P also corresponds to the pitch between each of the stages 11 through 14. The hangers 16 stop at each of the stages 11 through 14 for a fixed period of time, and predetermined installing, fastening, and inspection operations are carried out during this fixed period of time. Once the operations have been completed, the vehicle body 10 is moved one pitch and conveyed to the adjacent downstream stage.

Figure 2:
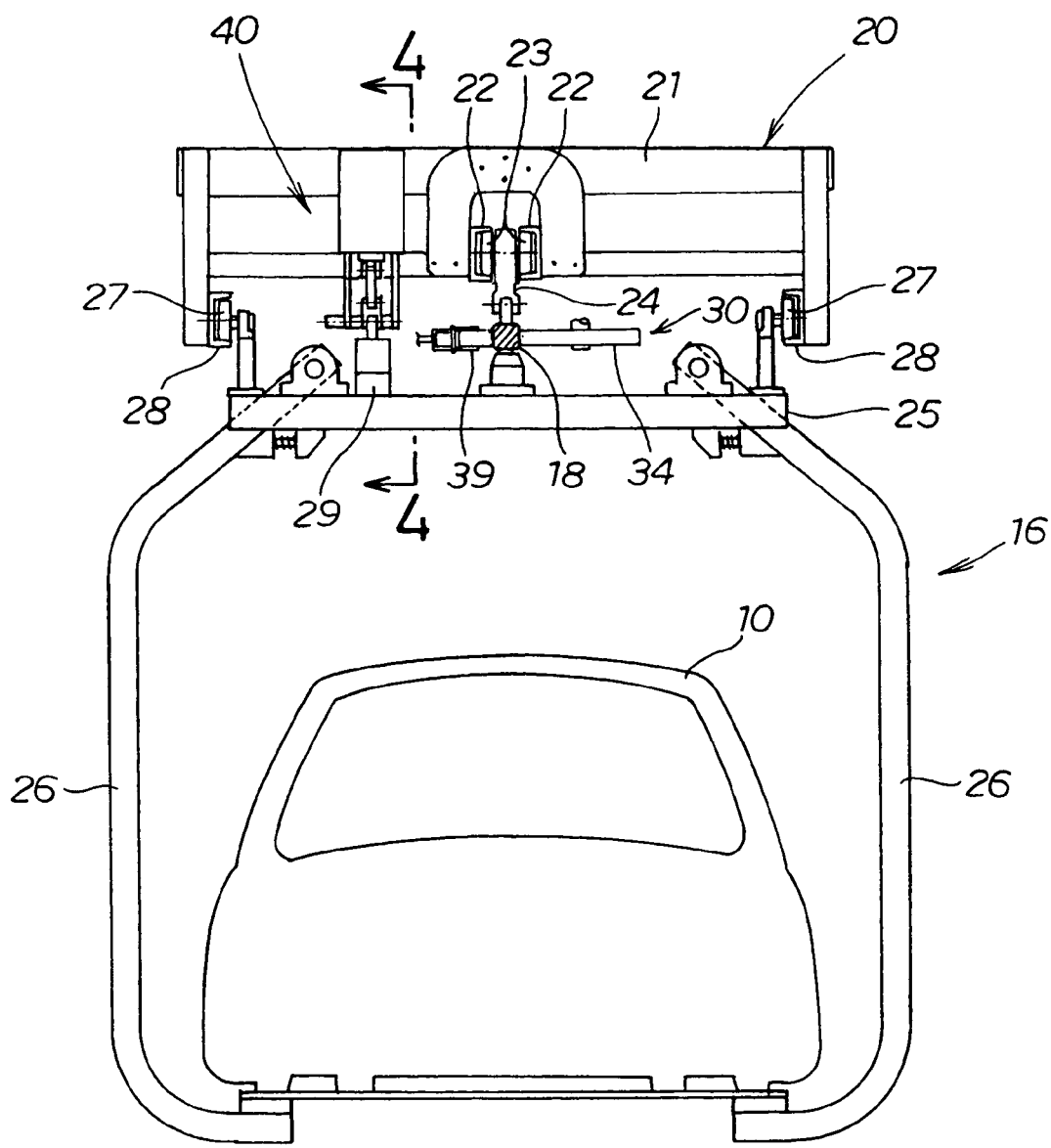
FIG. 2 is an enlarged cross-sectional view taken along line 2-2 of FIG. 1.

FIG. 2 shows the relationship between the hangers 16 and the support rail 20.

The support rail 20 attached to the building 17 (FIG. 1) comprises a framework 21 that has a plurality of frames, and center rails 22, 22 provided to the center of the framework 21.

The hangers 16 comprise center wheels 23, 23 that travel along the center rails 22, 22 in the direction perpendicular to the drawings; a stay 24 for supporting a bar 18 that extends downward from the center wheels 23, 23 in the direction perpendicular to the drawings; an upper hanger frame 25 that is supported by the bar 18; hanger arms 26, 26 that hang down to the left and right from the upper hanger frame 25, and support the vehicle body 10; and left and right side wheels 27, 27 that protrude from the left and right ends of the upper hanger frame 25. Protrusions 29 protrude upward from the upper hanger frame 25.

The left and right side wheels 27, 27 travel along side rails 28, 28 provided to the framework 21. Specifically, the hangers 16 are supported on the support rail 20 by a plurality of wheels comprising the center wheels 23, 23 and the left and right side wheels 27, 27. Therefore, no risk is presented of the vehicle body 10 swinging to the left, right, up, or down while being conveyed.

In the present embodiment, a hanger drive device 30, which can forcibly move the hangers 16 in the direction perpendicular to the drawings, is disposed between the bars 18, and a pushing mechanism 40 for aiding the hanger drive device 30 is provided in the vicinity of the center rail 22. The device 30 and the mechanism 40 will be described in detail below in the order stated above.

Figure 3:
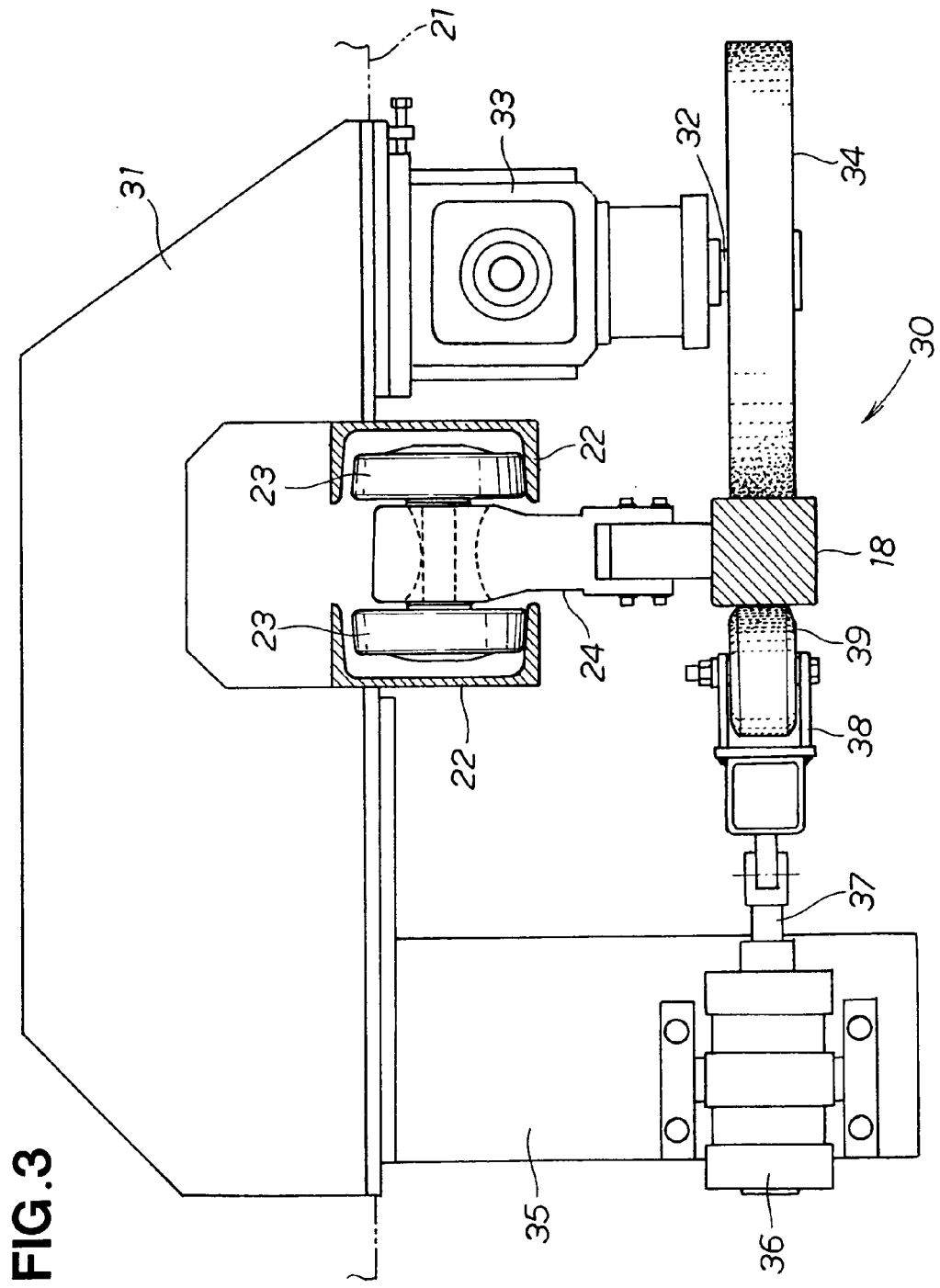
FIG. 3 is an enlarged view showing a hanger drive device of FIG. 2.

FIG. 3 shows the hanger drive device 30 of the present embodiment.

The hanger drive device 30 comprises a gear case 33, which is attached to a bracket 31 fixed to the framework 21 so that an output shaft 32 faces downward; a drive wheel 34, which is horizontally attached to the output shaft 32 of the gear case 33, so as to face the bar 18; a first cylinder 36 that is fixed to a sub-bracket 35 extending downward from the bracket 31; a fork member 38 provided to a piston shaft 37 of the first cylinder 36; and a pinch roll 39, which is rotatably provided to the fork member 38, and disposed so as to face the bar 18.

The drive wheel 34 and the pinch roll 39 are disposed facing one another on either side of the bar 18.

When the drive wheel 34 rotates and the pinch roll 39 is advanced (moved from the left to the right with respect to the drawing), the bar 18 will be pressed against the drive wheel 34, and the friction between the bar 18 and the drive wheel 34 will increase. As a result, the bar 18 will begin to move in the direction perpendicular to the drawings.

Even when the drive wheel 34 is rotating, the bar 18 will separate therefrom when the pinch roll 39 retracts (moves from right to left in the drawing), and friction between the bar 18 and the drive wheel 34 will disappear. The bar 18 will accordingly stop moving.

Specifically, the hanger drive device 30 has the drive wheel 34 and the pinch roll 39, which are provided to the building (e.g., the framework 21) on either side of the bar 18; and the cylinder 36, which is provided to the building, and causes the pinch roll 39 to move back and forth with respect to the drive wheel 34. When the bar 18 is pushed against the drive wheel 34 by the pinch roll 39, the bar 18 will be able to move, and when the pinch roll 39 returns to the stand-by position, the bar 18 will move away from the drive wheel and stop moving.

Figure 4:
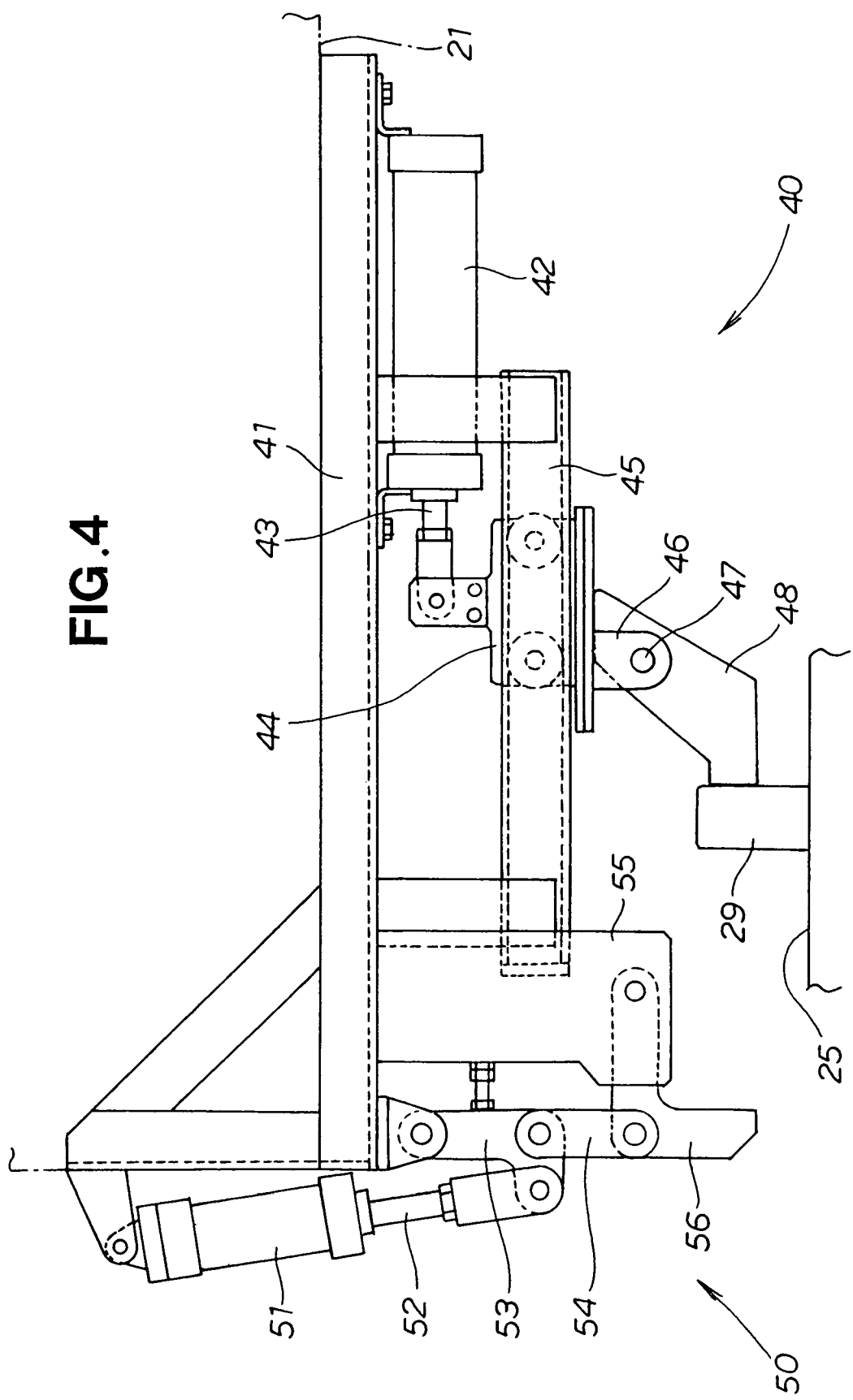
FIG. 4 is an enlarged cross-sectional view taken along line 4-4 of FIG. 2.

Next, the pushing mechanism 40 for aiding the hanger drive device 30 will be described on the basis of FIG. 4.

The pushing mechanism 40 comprises a frame 41 that is fixed to the framework 21, and that has an L-shaped cross-section; a second cylinder 42 that is horizontally attached to the L-shaped frame 41; a slider 44 provided to a piston rod 43 of the second cylinder 42; a guide rail 45 for horizontally guiding and supporting the slider 44; an eye plate 46 that extends downward from the slider 44; and an pushing piece 48 pivotably attached to the eye plate 46 via a shaft 47. The pushing piece 48 pushes the protrusions 29 extending upward from the upper hanger frame 25.

A positioning mechanism 50 as described below is preferably provided to the pushing mechanism 40.

The positioning mechanism 50 has a third cylinder 51 vertically and pivotably attached to the L-shaped frame 41; an L-shaped first link 53 having one end connected to a distal end of a piston rod 52 of the third cylinder 51, and the other end pivotably attached to the L-shaped frame 41; an I-shaped second link 54 that is connected to the center of the first link 53, and extends downward; and an L-shaped piece 56 that is driven by the second link 54, and supported on the L-shaped frame 41 via a sub-bracket 55.

The action of the pushing mechanism 40 and the positioning mechanism 50 shall be described below.

Figure 5A:
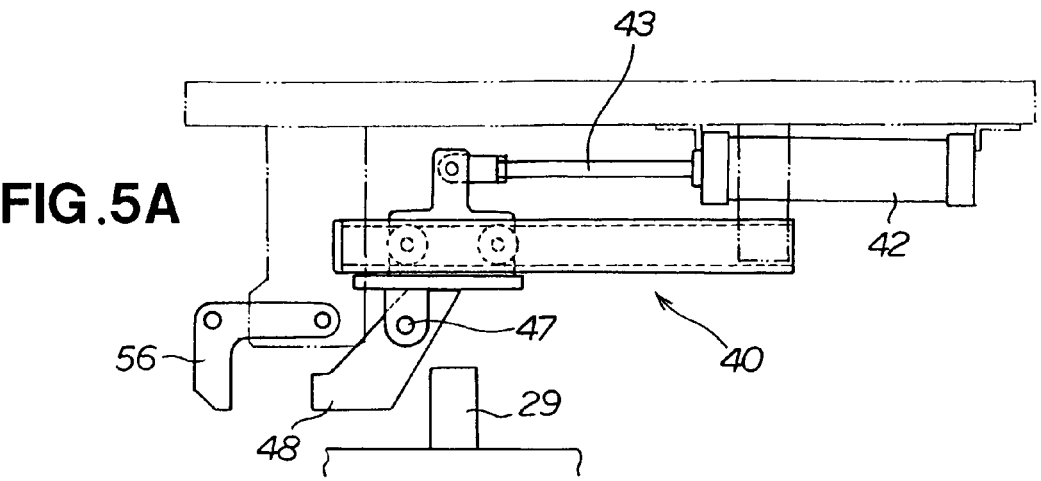
FIGS. 5A to 5C are schematic views showing states in which a protrusion on the hanger is moved to an pushing mechanism.
Figure 5B:
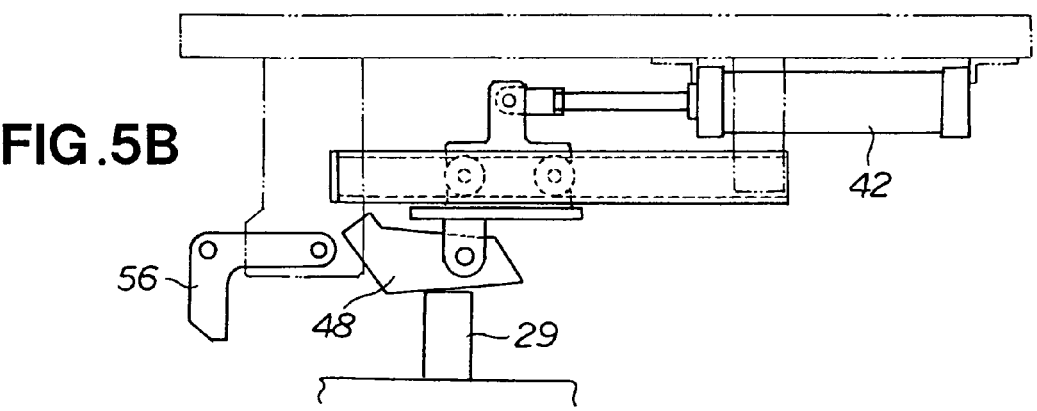
Figure 5C:
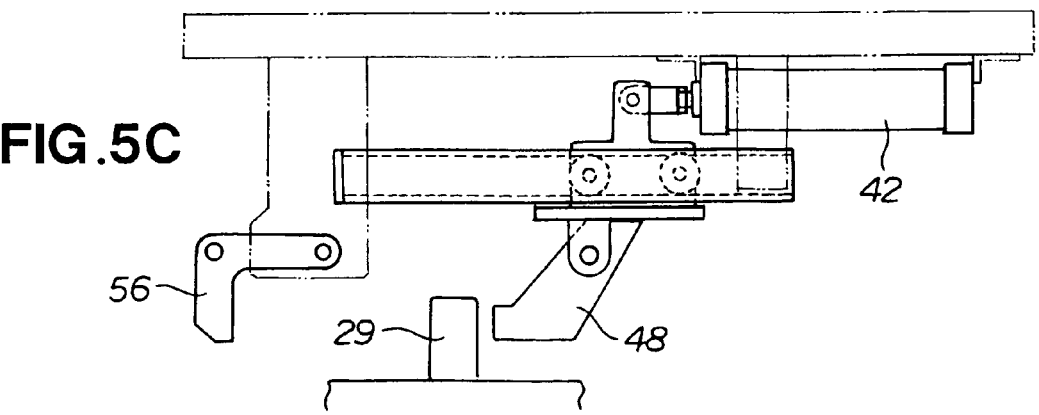

FIGS. 5A through 5C show a state in which a protrusion 29 on the hanger advances toward the pushing mechanism 40.

As shown in FIG. 5A, the protrusion 29 on the hanger advances below the pushing mechanism 40, and the pushing piece 48 is positioned to the left of the protrusion 29 in the diagram. The piston rod 43 of the first cylinder 36 is then retracted.

As a result, the pushing piece 48 rotates clockwise around the shaft 47, and passes over the protrusion 29, as shown in FIG. 5B.

The pushing piece 48 accordingly moves to the right of the protrusion 29 in the drawing. The piston rod 43 of the first cylinder 36 is then advanced.

Figure 6A:
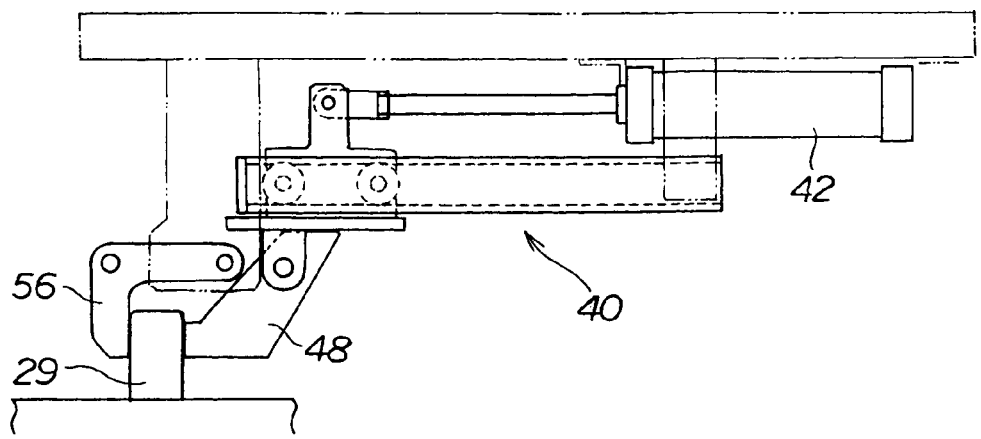
FIGS. 6A to 6C are schematic views showing states when the protrusion on the hanger is withdrawn from the pushing mechanism.
Figure 6B:
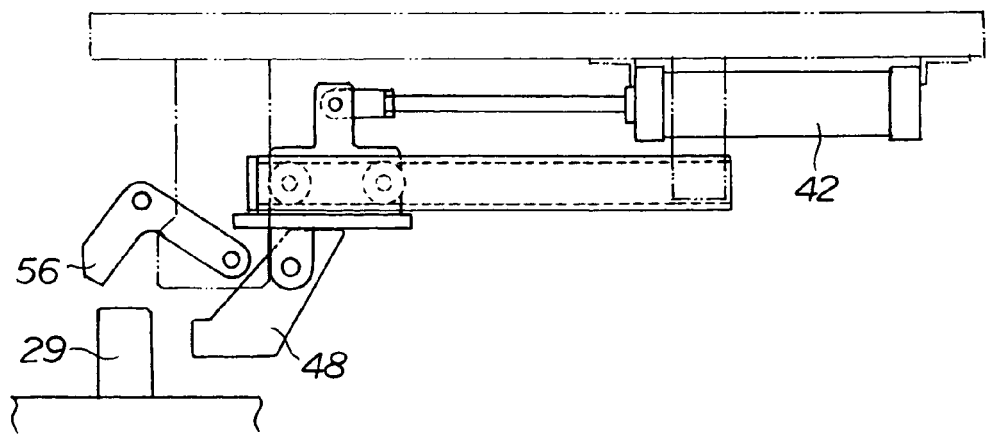
Figure 6C:
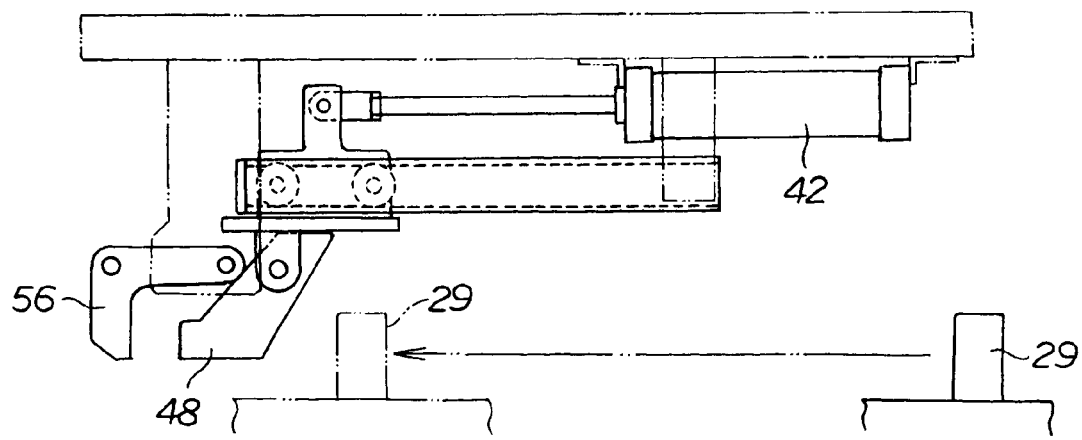

FIGS. 6A through 6C show states in which the protrusion 29 on the hanger comes out of the pushing mechanism 40.

As shown in FIG. 6A, the protrusion 29 is pushed toward the left of the diagram by the pushing piece 48, and stops on coming into contact with the L-shaped piece 56. Specifically, since the protrusion 29 extends from the hanger, pushing the protrusion 29 can cause the hanger to move. The hanger can be brought to a stop by the L-shaped piece 56.

The protrusion 29 is held between the L-shaped piece 56 and the pushing piece 48, and movement can therefore be completely prevented. The installation, fastening, and inspection operations illustrated in FIG. 1 may be carried out in this state.

When these operations have been completed, the L-shaped piece 56 is turned clockwise as shown in FIG. 6B, whereupon the protrusion 29 can be moved toward the left of the diagram. The protrusion 29 will not move toward the right of the diagram due to the presence of the pushing piece 48.

When the protrusion 29 is moved toward the left of the diagram, the next protrusion 29 will advance to a position shown by the imaginary line, as shown in FIG. 6C. The process will have thereby returned to the state depicted in FIG. 5A.

FIGS. 7A through 7C show states in which the bar 18 on the hanger is in motion.

As shown in FIG. 7A, the protrusion 29 is restrained by the L-shaped piece 56 and the pushing piece 48, whereby a variety of operations are performed. At this time, the bar 18 is not affected by the drive action of the drive wheel 34.

When a variety of operations have been completed, the piston shaft 37 of the first cylinder 36 will be advanced, and the bar 18 will be pushed against the drive wheel 34 by the pinch roll 39. As a result, the bar 18 is moved toward the left of the diagram by the rotation of the drive wheel 34.

When the bar 18 has moved a fixed distance, the pinch roll 39 will be retracted, and the drive wheel 34 will begin to rotate freely, as shown in FIG. 7C. The protrusion 29 is pushed towards the L-shaped piece 56 by the pushing piece 48. The next operation will be performed when the protrusion 29 has come into contact with the L-shaped piece 56.

Although this has not yet been described, a motor is commonly provided to each of the drive wheels 34, and each of the drive wheels 34 is caused to rotate.

In a vehicle installation line, conveying is carried out by a so-called takt method, whereby the plurality of hangers 16 are moved simultaneously, stopped simultaneously, and again moved simultaneously. For the takt conveyance method, the equipment configuration described below is recommended.

Figure 8:
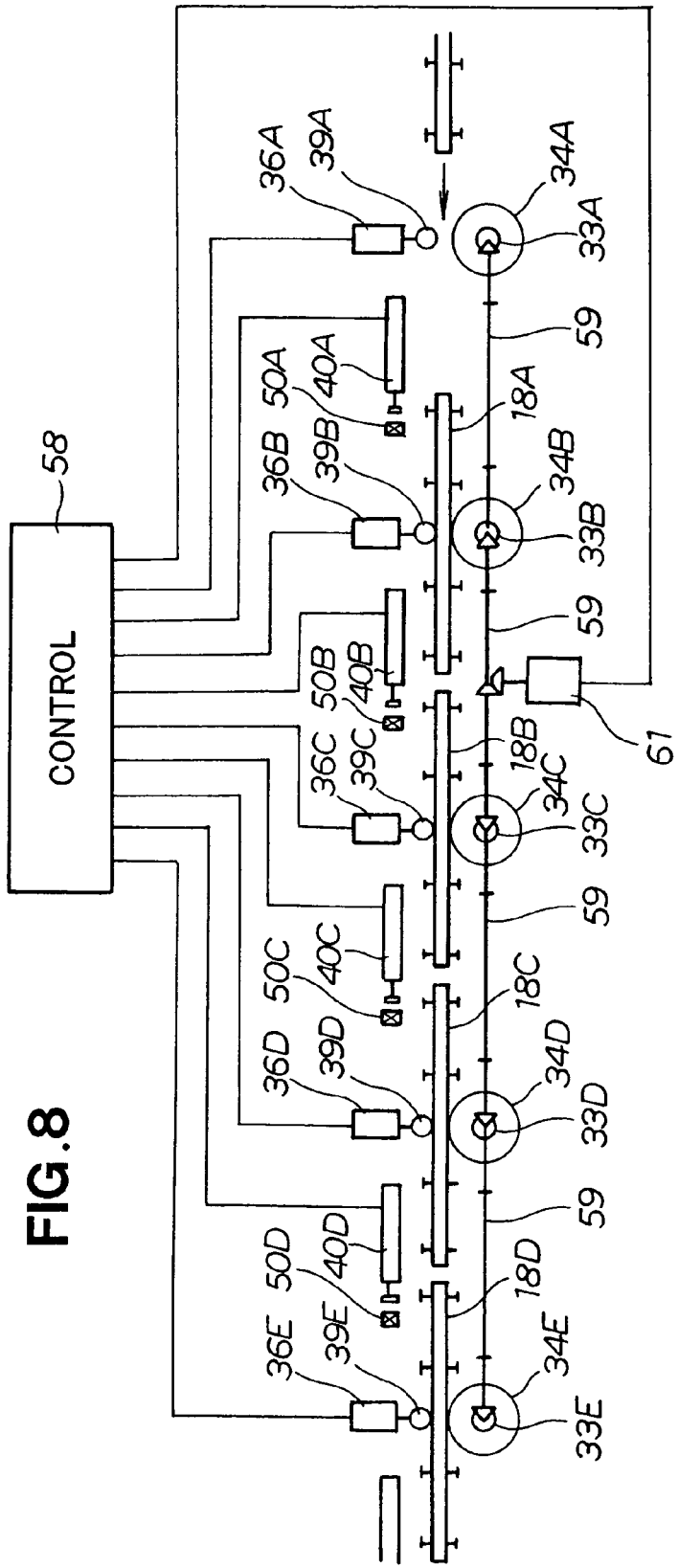
FIG. 8 is a schematic view showing a state in which a hanger drive device is driven by a single motor.
Figure 9A:
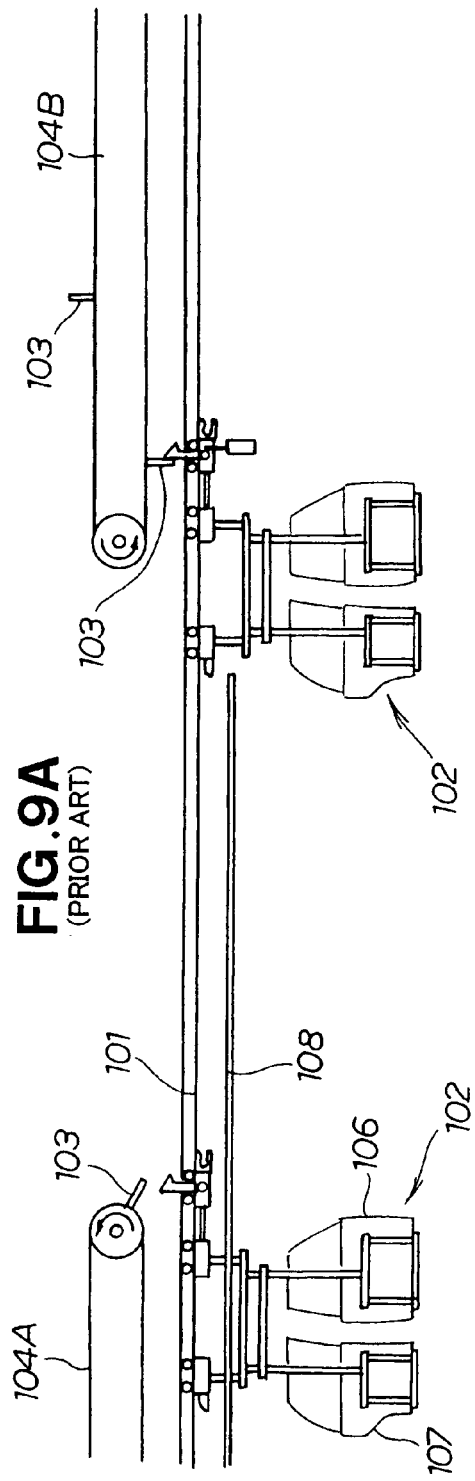
FIGS. 9A and 9B are schematic views showing a conventional hanger device.
Figure 9B:
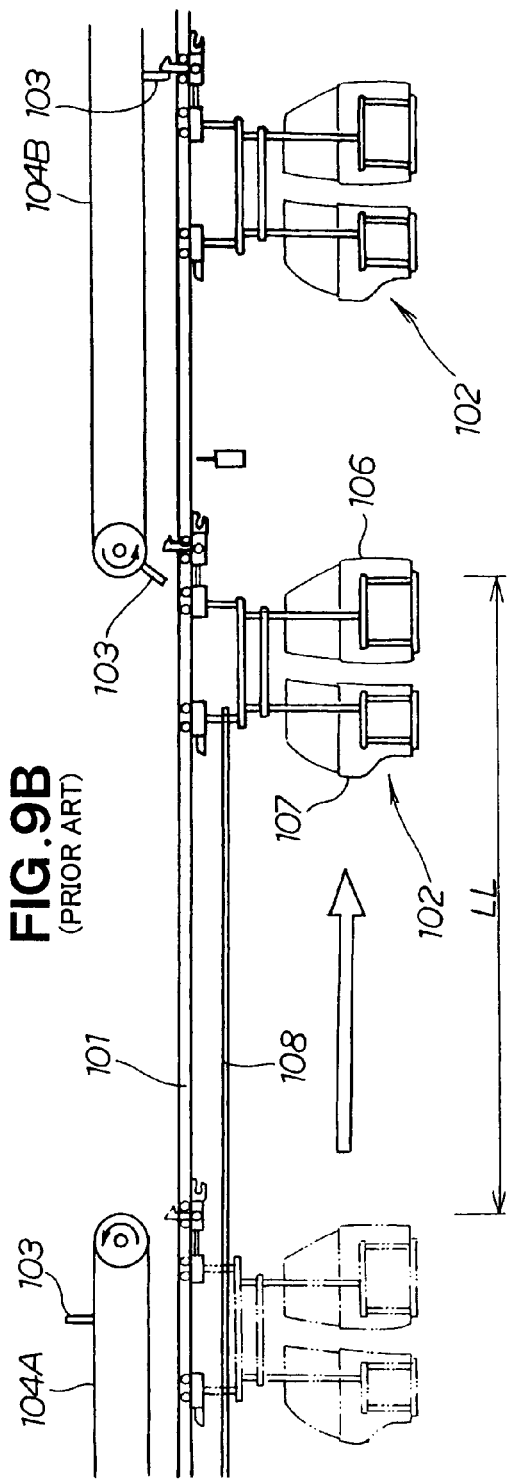

FIG. 8 shows the principle of the hanger drive device.

The following components are disposed along the conveying path; namely first through fifth gear cases 33A through 33E (A through E are added to clearly distinguish the positions thereof; the same applies below); first through fifth drive wheels 34A through 34E; first through fifth pinch rolls 39A through 39E; first through fifth cylinders 36A through 36E; first through fourth positioning mechanisms 50A through 50D; and first through fourth pushing mechanisms 40A through 40D. Control over these constituent elements is consolidated using a controller 58.

The first through fifth drive wheels 34A through 34E are connected together by a connecting shaft 59, and the connecting shaft 59 is driven by a single drive source (motor) 61.

In a case where a motor is attached to each of the first through fifth drive wheels 34A through 34E, a risk is presented that the adjacent bars 18 will collide when a difference exists in the speed of the motors. As a result, servo motors are used as the motors, and precision speed control becomes necessary, which increases the equipment cost.

In this respect, if the first through fifth drive wheels 34A through 34E are driven by a single drive source 61, no concerns will be presented in regard to collisions between, e.g., the bar 18A and the adjacent bar 18B, or the bar 18C and the adjacent bar 18D. An inexpensive general-purpose motor can be used for the drive source, and equipment costs can be reduced.

The conveyance objects can be any type of vehicle-mounted components or general cargo in addition to vehicle bodies.

The long bar provided to the hanger may be a pipe or a frame as well as a rod, and the shape thereof may be altered.

The hanger may be a type of conveying means in which a conveyance object is carried and conveyed as well as a type of conveying means in which an object is conveyed while suspended.

Any structure may be used in the cylinder for moving the pinch roll back and forth, as long as a pneumatic cylinder, a hydraulic cylinder, an electrically actuated cylinder, or another linear movement mechanism is used.

Obviously, various minor changes and modifications of the present invention are possible in light of the above teaching. It is therefore to be understood that within the scope of the appended claims the invention may be practiced otherwise than as specifically described.

What is claimed is:

1. A hanger system for conveying a conveyance object by using a hanger, the system comprising:
   a plurality of hangers each having a bar whose length does not exceed a pitch of adjacent hangers; and
   a plurality of hanger drive devices provided correspondingly to the hangers to drive the respective hangers,
   wherein each of the hanger drive devices includes a drive wheel and a pinch roll which are disposed on either side of the bar and provided on a building, and a cylinder provided on the building for moving the pinch roll back and forth with respect to the drive wheel, so that the respective hanger moves when the respective bar is pushed against the drive wheel by the pinch roll and stops moving when the pinch roll returns to a stand-by position to cause the bar to separate from the drive wheel.

2. The hanger system of claim 1, wherein the drive wheels are adapted to be driven by a single drive source.

3. The hanger system of claim 1, further comprising a plurality of pushing mechanisms disposed on the building for pushing the respective hangers at least a difference between the pitch and the length of the bars in order to compensate for the difference between the pitch and the length of the bars.

* * * * *